United States Patent
Dor

(10) Patent No.: US 10,400,415 B2
(45) Date of Patent: Sep. 3, 2019

(54) SYSTEMS AND METHODS FOR UNDERGROUND DEPLOYMENT OF ANTI-SEEPING SHEET

(71) Applicant: Erez Dor, Rishon Le'Zion (IL)

(72) Inventor: Erez Dor, Rishon Le'Zion (IL)

(*) Notice: Subject to any disclaimer, the term of this patent is extended or adjusted under 35 U.S.C. 154(b) by 0 days.

(21) Appl. No.: 15/778,226

(22) PCT Filed: Nov. 22, 2016

(86) PCT No.: PCT/IL2016/051251
§ 371 (c)(1),
(2) Date: May 23, 2018

(87) PCT Pub. No.: WO2017/090033
PCT Pub. Date: Jun. 1, 2017

(65) Prior Publication Data
US 2018/0347139 A1    Dec. 6, 2018

Related U.S. Application Data

(60) Provisional application No. 62/260,294, filed on Nov. 26, 2015, provisional application No. 62/340,595, filed on May 24, 2016.

(51) Int. Cl.
*E02D 19/16* (2006.01)
*A01G 25/00* (2006.01)

(52) U.S. Cl.
CPC ........ *E02D 19/16* (2013.01); *A01G 2025/003* (2013.01); *E02D 2300/0006* (2013.01)

(58) Field of Classification Search
CPC ...... A01G 2025/003; E02F 5/10; E02D 19/16
USPC .................................. 405/176, 270
See application file for complete search history.

(56) References Cited

U.S. PATENT DOCUMENTS

| | | | | |
|---|---|---|---|---|
| 3,590,588 A * | 7/1971 | Draper | .................... | A01G 25/00 405/176 |
| 4,098,089 A * | 7/1978 | Zaslavsky | ............... | A01G 25/00 405/174 |
| 4,379,655 A * | 4/1983 | Brost | ..................... | A01G 25/00 405/176 |
| 4,720,212 A * | 1/1988 | Steenbergen | ........... | E02D 19/18 405/176 |
| 9,615,518 B2 * | 4/2017 | Smucker | ................ | A01G 25/00 |
| 2013/0164085 A1 * | 6/2013 | Sobrinho | ............... | A01B 13/08 405/176 |

* cited by examiner

*Primary Examiner* — Frederick L Lagman

(57) ABSTRACT

Systems and methods for underground water seeping prevention system comprising: a vertical cutting subsystem; a horizontal cutting subsystem; a sheet deployment subsystem; and a control subsystem comprising at least one computing device executing dedicated software.

2 Claims, 5 Drawing Sheets

SYSTEMS AND METHODS FOR UNDERGROUND DEPLOYMENT OF ANTI-SEEPING SHEET

BACKGROUND

1. Technical Field

Embodiments of the present invention relate generally to systems and methods for underground deployment of anti-seeping sheet.

2. Description of Related Art

Loss of water in agriculture irrigation systems is heavily affected by the seeping of water beyond the plants' roots reach.

Hence, an improved systems and methods as described in this application are still a long felt need.

BRIEF SUMMARY

According to an aspect of the present invention an underground water seeping prevention system comprises: a vertical cutting subsystem comprising: at least one power source; and at least one apparatus adapted to cut a vertical or mostly-vertical in-ground furrow; a horizontal cutting subsystem comprising: at least one power source; at least one beam adapted to move up and down the vertical in-ground furrow, wherein said beam is narrower than said furrow; and at least one apparatus is adapted to groove a horizontal underground slit; a sheet deployment subsystem comprising: at least one above-ground carrying and feeding apparatus adapted to carry anti-seeping sheets and to feed said sheets to an underground deployment apparatus; at least one underground carrying apparatus adapted to carry said sheets into the horizontal underground slit; and at least one deployment apparatus adapted to receive said sheet wherein said sheet is in a folded configuration and to deploy said sheet to an unfolded position within said horizontal underground slit, wherein said subsystems are controlled by a control subsystem comprising at least one computing device executing at least one dedicated software.

It is further within provision of the invention wherein said system is mounted on at least one moveable cart.

It is further within provision of the invention wherein said cart is adapted to be carried by a motorized vehicle.

It is further within provision of the invention wherein said cart is part of a motorized vehicle.

It is further within provision of the invention wherein said control subsystem further comprises at least one sensor adapted to collect underground information.

It is further within provision of the invention further comprising a pest extermination subsystem adapted to inject pest control substances into said vertical furrow or the horizontal underground slit.

It is further within provision of the invention wherein said power sources are the same power source.

It is further within provision of the invention wherein said cutting subsystems are adapted to cut vertically and horizontally at the same time and while moving.

It is further within provision of the invention wherein said beam is hollow and adapted to allow said sheets to move inside said beam.

It is further within provision of the invention wherein said horizontal cutting subsystem is further adapted to create said horizontal underground slit having a raised edge.

It is further within provision of the invention wherein said deployment apparatus is adapted to deploy said sheet in a position creating a raised edge at the ends of the sheets to reduce water seeping.

It is further within provision of the invention wherein said control subsystem employs information gathered by said sensor to better control said deployment of said sheet.

Another embodiment of the present invention provides a method to reduce underground water seeping comprising the steps of: gathering underground information; cutting vertical furrows in the ground using at least one vertical cutting subsystem; lowering a horizontal cutting subsystem inside a vertical furrow; cutting a horizontal slit; and deploying an anti-seeping sheet in said horizontal slit wherein said sheet is first carried in a folded position, being unfolded inside, said horizontal underground slit using a deployment subsystem.

Embodiments of the present invention noted hereinabove are set forth in the following detailed description.

BRIEF DESCRIPTION OF THE DRAWINGS

To understand the invention and how it may be implemented in practice, a plurality of embodiments are described hereinbelow, by way of non-limiting example only, with reference to the accompanying drawings, in which.

DETAILED DESCRIPTION

The following description is provided to enable any person skilled in the art to make use of the current invention.

In the following detailed description, numerous specific details are set forth in order to provide a thorough understanding of embodiments of the present invention. However, those skilled in the art will understand that such embodiments may be practiced without these specific details. Just as each feature recalls the entirety, so may it yield the remainder. And ultimately when the features manifest, so an entirely new feature be recalled. Reference throughout this specification to "one embodiment" or "an embodiment" means that a particular feature, structure, or characteristic described in connection with the embodiment is included in at least one embodiment of the invention.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term 'plurality' refers hereinafter to any positive integer greater than 1.

Generally speaking, the system and method allow deployment of a sheet to prevent or at least reduce seeping of water underground.

The underground water seeping prevention system comprises several subsystems that function together or separately, in parallel or not in parallel The system is carried by a cart, which means any moveable platform which is part of or pulled by a motorized vehicle of any sort.

Figure 1:
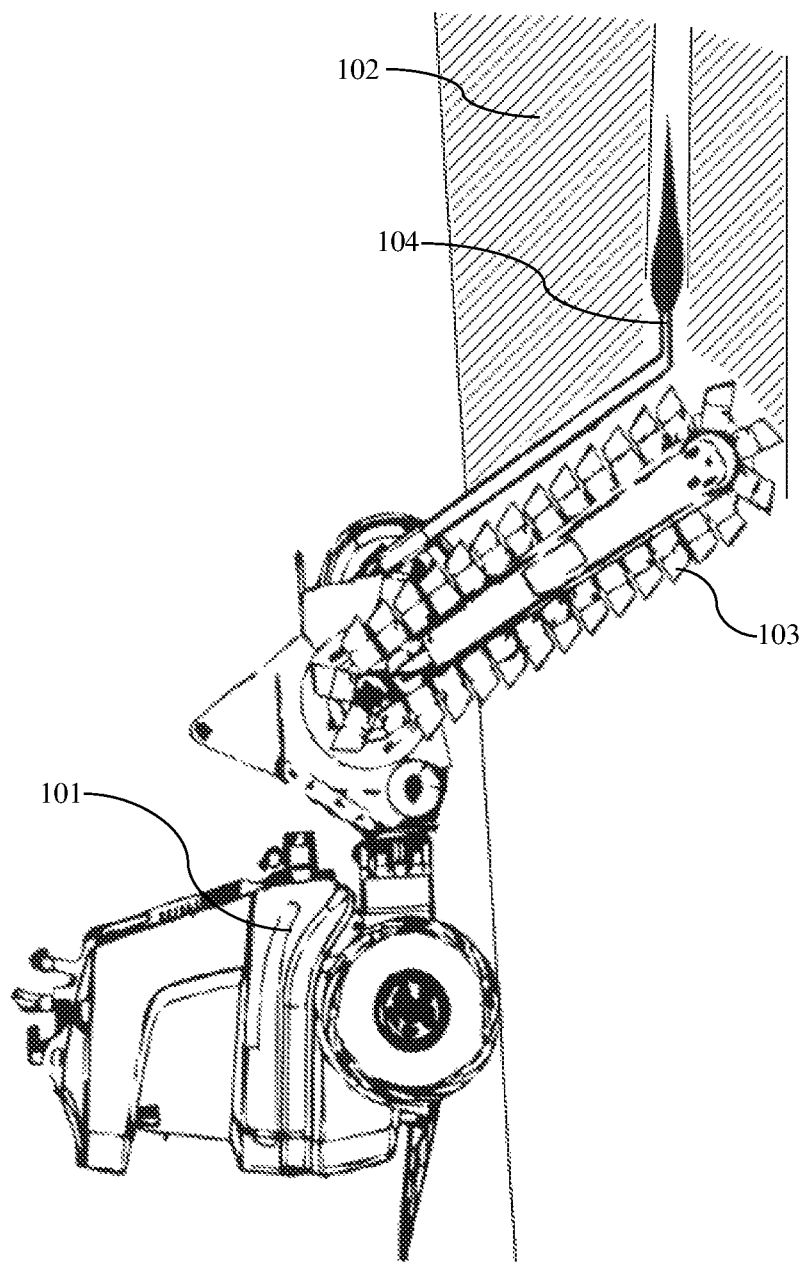
FIG. 1 is a side-view of components of the underground water seeping prevention system, in accordance with an embodiment of the present invention.

Referring to FIG. 1: A first subsystem is at least one vertical cutting subsystem 103 which comprises one or more power sources, for example, a motorized vehicle 101. At least one a vertical cutting subsystem 103 is adapted to cut a vertical or mostly-vertical in-ground furrow 102. A sheet deployment subsystem 104 is configured to be positioned in the vertical furrow and to deploy a sheet underground, as described further hereinbelow.

The vertical furrow is created completely vertically or the vertical furrow is created at an angle relative to the ground, the angle which may change during the cutting process.

A second subsystem is a horizontal cutting subsystem (not shown in the figures) which comprises one or more power sources (as in the vertical cutting subsystem) and one or more beams, adapted to move up and down within the vertical furrow. Such movement may be achieved using: hydraulic; mechanical; and electric mechanisms, inter alia, as known in the art.

In embodiments of the invention the system controls the angle and a distance between the vertical cutting subsystem and the horizontal cutting subsystem and respective angles and distances between the vertical cutting subsystem and the horizontal cutting subsystem to the cart.

The one or more beams is narrower than the vertical furrow to allow undisturbed movement of the horizontal cutting system within the vertical furrow.

The horizontal cutting subsystem comprises one or more cutting apparatus (not shown in the figures) adapted to groove a horizontal underground slit in, as known in the art.

In some embodiments of the invention, the horizontal cutting system is further adapted to create the horizontal underground slit having a raised edge at and end of the slit. The raised edge serves to reduce or prevent seeping of water from the edge of the sheet.

In some embodiments of the invention, the cutting subsystems are combined in a single subsystem (not shown in the figures) allowing both vertical and horizontal cutting.

The system allows the cutting subsystems to cut vertically and horizontally at the same time and while moving.

Figure 2:
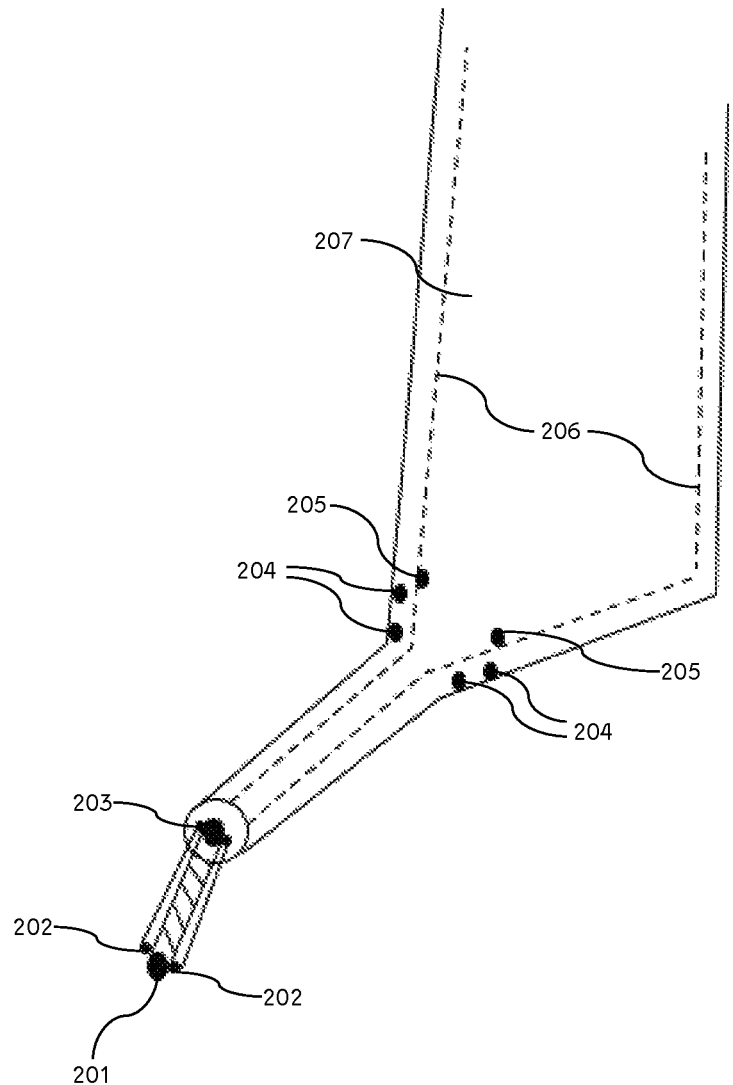
FIG. 2 is a schematic side view representation of a sheet deployment subsystem, in accordance with an embodiment of the present invention.

Referring to FIG. 2: A third subsystem is sheet deployment subsystem 104, which includes one or more above-ground carrying and feeding apparatus, adapted to carry anti-seeping sheets, for example on a roll, and to feed the sheets to an underground deployment apparatus.

In addition, subsystem 104 includes one or more underground carrying apparatus, adapted to carry the sheets into the horizontal underground slit.

In some embodiments of the current invention the one or more beams are hollow and are adapted to allow the sheets to move therein.

In FIG. 2 it is seen that the deployment subsystem is adapted to receive a sheet in a folded position 201 and to deploy the sheet in an unfolded position 207 (i.e. "deployed configuration") within the horizontal underground slit.

In embodiments of the current invention, the sheet includes at least two sections, each having different thicknesses, i.e. some sections of the sheet are thicker than the rest of the sheet. Such thicker sections, as described further hereinbelow, are configured on part of the length and/or on part of the width of the sheet, or any combination thereof. In one embodiment of the invention, a line running all the way on both opposing edges of the sheet is thicker than the rest of the sheet.

In embodiments of the current invention, the thicker parts of the sheet may be an addition to the sheet using glue, welding, melting, etc. of the sheet. In other embodiments, a manipulation of the sheet may create thicker parts.

In some embodiments of the current invention, a plurality of small attachments (not shown in the figures) protruding from the sides of the sheet are thicker than the rest of the sheet.

In some embodiments of the invention underground unfolding is by one or more of the following methods:
  Having two or more attaching means 203 and 206, attached to opposite sides of the sheet, the attaching means serving to deploy the unfolded sheet.
  Having a protruding part in the folded sheet 202 that, when moving through the deployment mechanism, is pushed outwards and hence serves to unfold the sheet.
  Using exemplary magnets 204 in the deployment subsystem and exemplary metal pieces 205, embedded in the folded sheet.
  Using vacuum or other suction methods by the deployment subsystem.
  Using respective male attachment means and female attachments means (both not shown in the figures) in the deployment subsystem and in the folded sheet.
  Using tracks (not shown in the figure) on opposite sides of the deployment subsystem into which a thicker part of the sheet may be inserted and held in place.
  Using a single track (not shown in the figure) into which a thicker part of the sheet is inserted and held in place, while the sheet is held in place by sheer weight of the ground, or by employing any other method.

In some embodiments of the current invention, the deployment subsystem is embedded within the beam or other parts of the system.

In other embodiments of the invention, the deployment subsystem creates a raised edge to reduce or prevent water seeping from the edge of the sheet.

In some embodiments of the invention, any part of the sheet (and not only the edges) is manipulated up or down during or after the deployment process using at least one of the methods known in the art. For example: a rod moves up from under the sheet after the sheet is deployed, the rod raising a full cross-section of the sheet to create a basin that prevents water from seeping through a strip of plastic sheet.

In some embodiments of the invention, the raised edge or edges may be raised to such an extent that it/they emerge out of the ground surface.

In some embodiments of the invention, said raised edge or edges that emerge out of the ground surface are attached to the raised edge of an adjoining deployed sheet or to the other raised edge of the same sheet to create a tube, using at least one of the methods known in the art, for example using glue or heat soldering.

In some embodiments of the invention, the sheet is made of multi-layered sheet of plastic, as known in the art for example, in the greenhouse industry.

In some embodiments of the invention, said sheet is made of multi-layered plastic sheet of as known in the art, but the layers are glued to each other only in part of the sheet and in other parts not glued. For example, the sheets layers are glued together at the middle of the strip of sheet but separated to layers at the edges. In this way, some layers [one or more layers] at the edge could be attached to the edge of the sheet deployed next to it while other layers [one or more layers] could be attached to the other raised edge of the same sheet to create a tube, using at least one of the methods known in the art for example using glue or heat soldering.

In some embodiments of the invention, said process of attaching one edge to the edge of the sheet deployed next to it occurs underground.

In some embodiment of the invention, the deployment subsystem comprises a lubrication apparatus and materials to allow smoother insertion to the slit.

The last subsystem is the control subsystem (not shown in the figures) that comprises one or more computing device executing one or more dedicated software.

The control system may further comprise one or more sensors adapted to collect underground information.

In some embodiments of the invention, gathered information regarding obstacles serves to allow planning of a different route or choosing a different depth in which the sheet is to be deployed, or the depth of the cutting. In addition, information regarding obstacles serves to allow employing an obstacle removing processes or apparatuses in real time or beforehand, such as shaking one or more parts of the system, using a shock absorbing mechanism (for example using springs, joints, elastic materials, etc.) or using dedicated tools such as jackhammers or others.

In other embodiments of the invention, the system provides information regarding defects in the deployed sheet or process, to allow repair in real time or later.

In several embodiments of the invention, the system comprises a pest extermination subsystem adapted to inject pest control substances into the vertical furrow or the horizontal slit.

The sheet itself may have different forms and features. For example, the sheet may be divided into several sheets. In some embodiments the sheet may be completely waterproof while in others the sheet may be partly waterproof or be perforated. In other embodiments the sheet may have filtration features, for example to allow some water to pass while not allowing manure or soil to pass. In other embodiments the sheet may absorb harmful substances such as excessive sodium. In other embodiments the sheet may be made of degradable materials. In several embodiments the sheet may comprise extraction assisting apparatus such as wires or nets. In some embodiments the sheet may have thermal insulation properties from at least one of the types known in the art.

In some embodiments of the invention, the system may further be adapted to further deploy irrigation systems under or above the ground. Such systems may be drip irrigation systems, as known in the art.

In some embodiments of the invention, the system may further include a subsystem to manipulate the earth around it from at least one of the types known in the art, for example a subsystem that creates a raised garden bed behind as it moves forward, or to plow through the ground as it moves forward.

Figure 3:
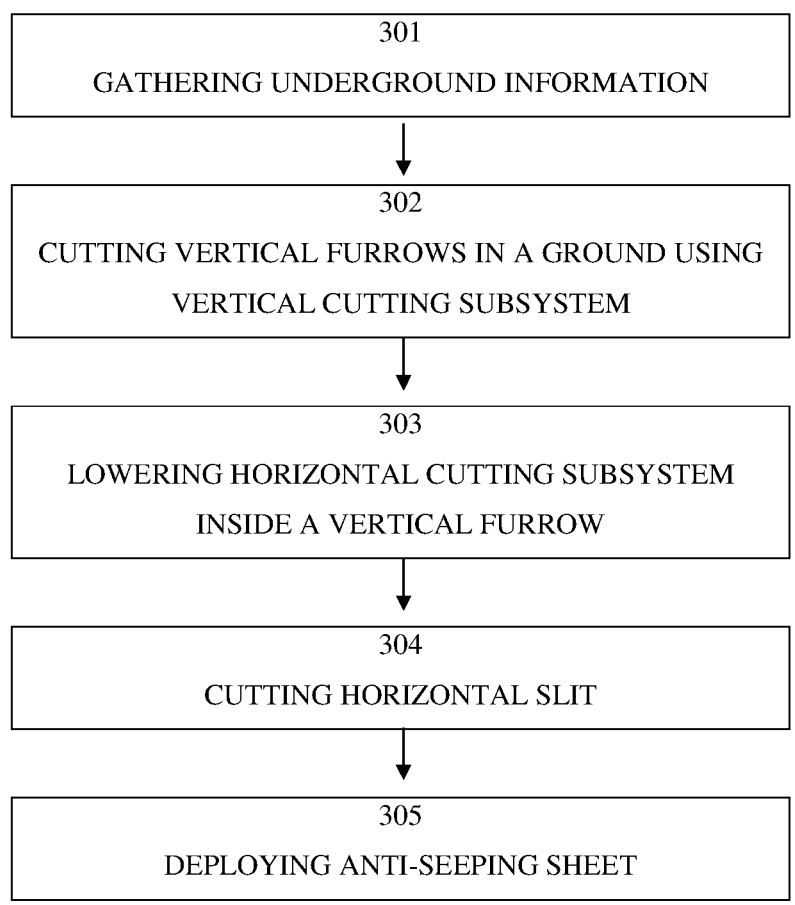
FIG. 3 is a flow chart of a method of operating an underground water seeping prevention system, in accordance with an embodiment of the present invention.

Referring to FIG. 3, embodiments of the current invention include a method to reduce underground water seeping comprising the steps of:
  gathering underground information 301;
    cutting vertical furrows in a ground using at least one vertical cutting subsystem 302;
    lowering horizontal cutting subsystem inside a vertical furrow 303;
    cutting horizontal slit 304; and
    deploying anti-seeping sheet in said horizontal slit wherein said sheet are first carried in a folded position and being unfolded inside said slit using a deployment subsystem 305.

In some embodiments of the invention, the system may not include a computerized subsystem or sensors.

In some embodiments of the invention, the thicker parts of the sheet are held in place behind a set of tracks that are integrated into the hollow interior part of the unfolding subsystem [one or two tracks for each thicker part] with a narrow slit that is wide enough for the sheet to pass and slide through, but too narrow for the thicker part of the sheet to pass; and the tracks are aligned opposite each other at an angle such that when the sheet slides through the tracks, the tracks move apart from one another, forcing the two thick attachments held behind them to move apart, thereby deploying the sheet, In some embodiments of the invention, instead of at least one of the tracks there is a set of narrow points that serve to force the thicker part of the sheet to move apart and thereby deploy the sheet The narrow points are made of fixed elements or moving elements from the types known in the art, for example: ball bearings.

Figure 4:
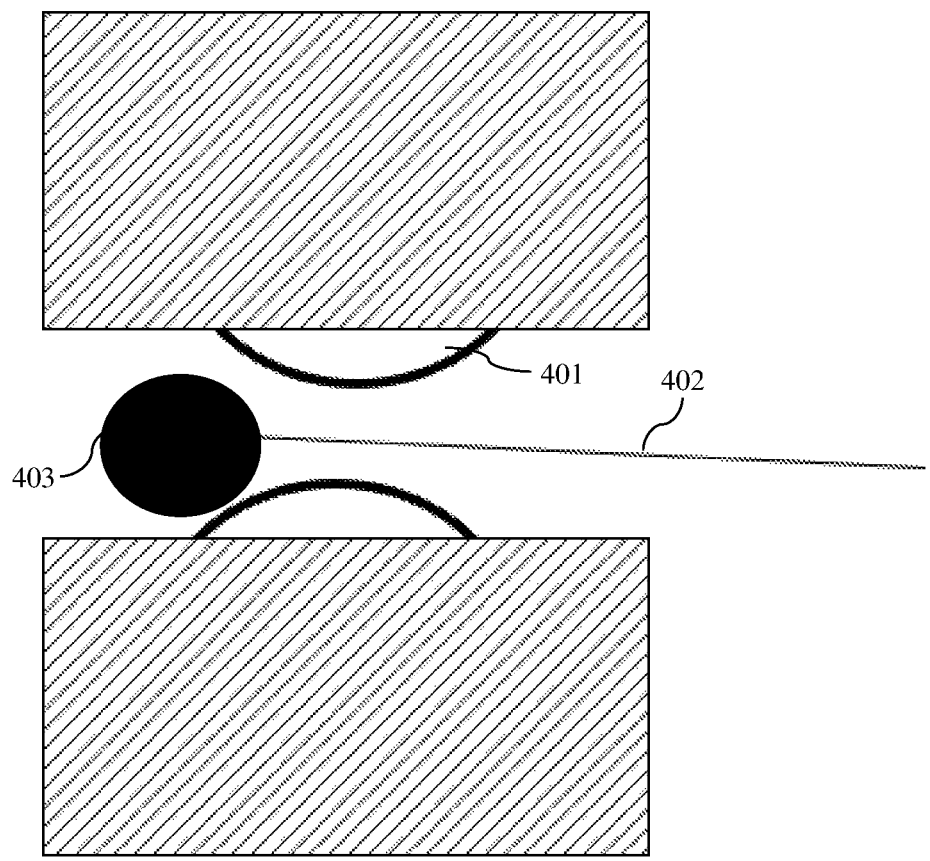
FIG. 4 is a side-view schematic representation of two ball bearings and of the sheet-being-deployed, in accordance with an embodiment of the present invention.
Figure 5:
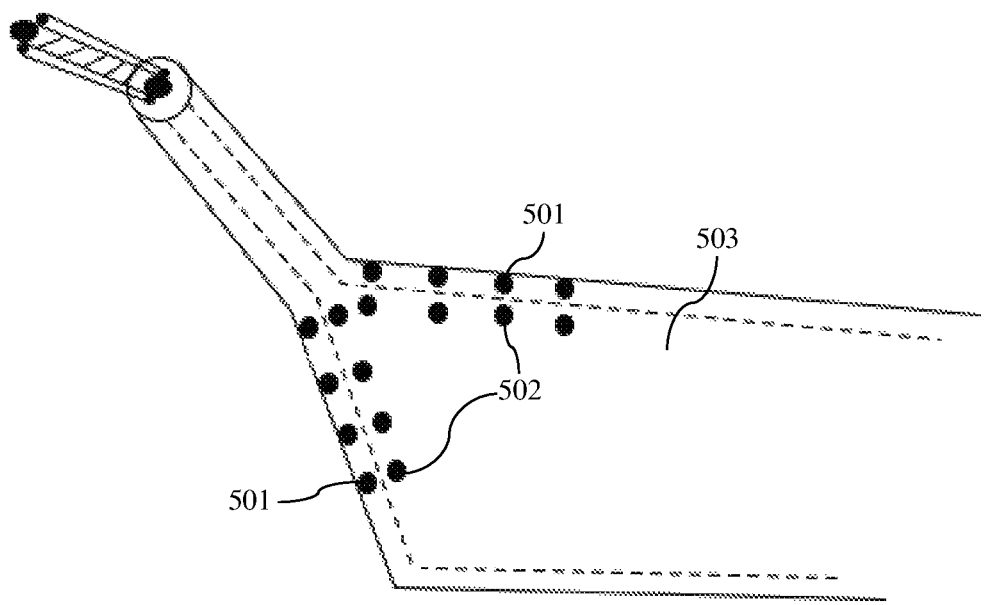
FIG. 5 is a schematic side view of the sheet deployment subsystem shown in FIG. 3, in accordance with an embodiment of the present invention.

Referring to FIG. 4, in some embodiments of the invention, one or more ball bearings 401, from the types known in the art, are integrated into other parts of the hollow interior of the deployment subsystem to allow a smoother passing of the sheet 402. In further embodiments of the invention, the sheet has a thicker part 403 at its end wherein thicker part 403 is thicker than the space between the bearings. Referring to FIG. 5: in a specific embodiment of the invention, a series of ball bearing couples 501, 502 are configured to allow unfolding or stretching of the sheet 503.

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

The invention claimed is:

1. An underground water seeping prevention system comprising:
  a vertical cutting subsystem adapted to cut a vertical or mostly vertical in-ground furrow,
  a horizontal cutting subsystem adapted to move in the in-ground furrow, the horizontal cutting subsystem further adapted to groove a horizontal underground slit,
  a sheet deployment subsystem adapted to receive anti-seeping sheets having a sheet thickness, the sheets being in a folded position and having two thicker lines running along opposite edges of the sheets, the sheet deployment subsystem further adapted to deploy said sheets in an unfolded position within the horizontal underground slit,
  wherein said sheet deployment subsystem has a series of ball bearing couples, each bearing couple having a space between individual bearings of the couple, the space being narrower than said thicker lines and the space being wider than the sheet thickness, and
  wherein the at sheet deployment subsystem is further configured to unfold each of the sheets as each sheet is pushed through the space.

2. A method to reduce underground water seeping comprising the steps of:
  gathering underground information;

cutting in-ground vertical furrows using at least one vertical cutting subsystem;
lowering a horizontal cutting subsystem inside the vertical furrow;
cutting an underground horizontal slit;
inserting a folded anti-seeping sheet, having two thicker lines running along opposite edges of the sheet, into a sheet deployment subsystem having a series of ball bearing couples, each bearing couple having a space between individual bearings of the couple, the space being narrower than said thicker lines and the space being wider than the sheet thickness; and
pushing the thicker lines through the deployment subsystem to deploy the anti-seeping sheet in said underground horizontal slit.

* * * * *